(12) United States Patent
Högasten et al.

(10) Patent No.: US 8,208,026 B2
(45) Date of Patent: Jun. 26, 2012

(54) SYSTEMS AND METHODS FOR PROCESSING INFRARED IMAGES

(75) Inventors: Nicholas Högasten, Santa Barbara, CA (US); Malin Ingerhed, Stockholm (SE)

(73) Assignee: Flir Systems, Inc., Wilsonville, OR (US)

( * ) Notice: Subject to any disclaimer, the term of this patent is extended or adjusted under 35 U.S.C. 154(b) by 599 days.

(21) Appl. No.: 12/396,340

(22) Filed: Mar. 2, 2009

(65) Prior Publication Data

US 2010/0220193 A1    Sep. 2, 2010

(51) Int. Cl.
*H04N 5/33* (2006.01)
(52) U.S. Cl. ...................................................... 348/164
(58) Field of Classification Search .................. 348/164
See application file for complete search history.

(56) References Cited

U.S. PATENT DOCUMENTS

| 5,881,182 A | 3/1999 | Fiete et al. |
| 2006/0262210 A1 | 11/2006 | Smith et al. |
| 2006/0279632 A1* | 12/2006 | Anderson ..................... 348/164 |

* cited by examiner

*Primary Examiner* — Larry Donaghue
*Assistant Examiner* — Marshall McLeod
(74) *Attorney, Agent, or Firm* — Haynes and Boone, LLP

(57) ABSTRACT

One or more embodiments of the invention provide a system and method for processing an infrared image to receive infrared image data of a non-uniform scene, apply column noise filter correction to the infrared image data, and/or apply row noise filter correction to the infrared image data, and provide corrected infrared image data based on the column and/or row noise filter correction as infrared output image data.

26 Claims, 9 Drawing Sheets

SYSTEMS AND METHODS FOR PROCESSING INFRARED IMAGES

TECHNICAL FIELD

The present invention relates generally to infrared imaging and, more particularly, to image processing of infrared images, such as with noise filtering techniques.

BACKGROUND

An image generated by an infrared imager, such as, for example, a microbolometer-based infrared imager, typically includes noise. For example, the dominant source of noise may be due to temporal, 1/f, and/or fixed spatial noise, and a typical infrared imaging system may include calibration algorithms to try to minimize these types of noise.

As an example, an infrared imaging system generally uses an internal shutter that lets the infrared imaging system acquire an image against a uniform target to perform calibration procedures. However, there are some drawbacks associated with this type of procedure. For example, the requirement of a shutter increases manufacturing costs of the infrared imaging system. In addition, the calibration procedure does not correct for noise sources beyond the shutter (e.g., due to a lens or other components within the optical path). Also, the scene temperature may be different from that of the shutter and the detector elements response to irradiation may not be completely linear. As such, a correction made at the shutter temperature may not be appropriate for the particular scene that the infrared imaging system is imaging. Moreover, during offset calibration using the shutter, the infrared imaging system may not be available to capture images of a scene, as desired by a user.

Human observers are particularly sensitive to high frequency spatial noise that is typical of infrared imagers. Low pass filters can be used to reduce noise but this blurs the image and lowers the system performance.

As a result, there is a need for improved techniques directed to infrared imaging and processing of infrared images that may reduce spatial, temporal, and/or 1/f type noise without relying on a shutter or requiring a uniform scene and that may introduce no or minimal blur.

SUMMARY

Systems and methods disclosed herein, in accordance with one or more embodiments, provide techniques for processing images captured by infrared sensors (e.g., infrared cameras), such as to improve image quality. For example, in accordance with an embodiment, image processing algorithms are disclosed to separate an infrared image into column and row parts or portions, which may be separately processed to reduce noise and provide an improved infrared image.

In accordance with one or more embodiments, systems and methods for processing infrared image data comprises receiving infrared image data from a non-uniform scene, separating the infrared image data into a column noise filter portion and a row noise filter portion, determining column noise offset terms, applying column noise filter correction to the infrared image data based on the column noise offset terms, determining row noise offset terms, applying row noise filter correction to the infrared image data based on the row noise offset terms, providing corrected infrared image data based on the column and row noise filter correction as infrared output image data, and storing the infrared output image data. In one implementation, an identical column noise offset term is applied to each corresponding pixel in a specific column in the column noise filter portion, and an identical row noise offset term is applied to each corresponding pixel in a specific row in the row noise filter portion.

In various implementations, the systems and methods may comprise separately calculating column neighbor differences of the row noise filter portion by calculating, for each pixel, a difference between a center pixel and a plurality of neighboring pixels, and separately calculating row neighbor differences of the column noise filter portion by calculating, for each pixel, a difference between a center pixel and a plurality of neighboring pixels. The systems and methods may comprise separately performing a histogram of the column and row neighbor differences after separately calculating column and row neighbor differences, separately comparing the column and row neighbor differences to a predetermined threshold, and adding the column and row neighbor differences to respective columns and rows, if the difference is below the predetermined threshold. In one aspect, adding the column and row neighbor differences for respective columns and rows comprises adding the column and row neighbor differences to the histogram for specific columns and rows, respectively.

In various implementations, the systems and methods may comprise determining a median difference for respective columns and rows, adding the median difference to one or more previous correction terms for respective columns and rows, and applying the correction terms to the infrared image data. In one aspect, the infrared image data comprises infrared input video data, the corrected infrared image data comprises corrected infrared video data, and the infrared output image data comprises infrared output video data. The systems and methods may comprise high pass filtering the infrared image data prior to estimating the column and row noise filter correction values. In one aspect, high pass filtering respective rows and columns comprises subtracting a result of a low pass filter operation. The infrared image data may comprise a plurality of frames, wherein each frame is separately corrected as a current frame having at least one previous frame except for a first frame. The systems and methods may comprise delaying the infrared image data by one frame and displaying the infrared output image data.

In accordance with an embodiment, a method for processing infrared image data comprises receiving infrared image data from a multi-pixel infrared detector based on a non-uniform scene, identifying a column noise filter portion of the infrared image data, determining column noise offset terms for corresponding columns, applying column noise filter correction to the infrared image data based on the column noise offset terms, wherein the column noise offset term is applied to at least a majority of the infrared image data in each corresponding column in the column noise filter portion, providing corrected infrared image data based on the column noise filter correction as infrared output image data, and storing the infrared output image data.

In accordance with an embodiment, an infrared imaging system comprises an infrared detector (e.g., as used by an infrared imaging device, such as an infrared camera), a processor adapted to process infrared image data from the infrared detector of a non-uniform scene, and a storage component adapted to store the infrared output image data. The processor may be adapted to process infrared image data from the infrared detector by receiving infrared image data from a multi-pixel infrared detector based on a non-uniform scene, identifying a column noise filter portion of the infrared image data, determining column noise offset terms for corresponding columns, applying column noise filter correction to the infrared image data based on the column noise offset terms, wherein the column noise offset term is applied to at least a majority of the infrared image data in each corresponding column in the column noise filter portion, and providing corrected infrared image data based on the column noise filter correction as infrared output image data.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Systems and methods disclosed herein, in accordance with one or more embodiments, provide image processing algorithms for images captured by infrared imaging systems. For example, in one embodiment, the infrared images may be processed to reduce noise within the infrared images (e.g., improve image detail and/or image quality). For one or more embodiments, processing techniques may be applied to reduce noise within a row and/or a column of the infrared image.

A significant portion of noise may be defined as row and column noise. This type of noise may be explained by non-linearities in a Read Out Integrated Circuit (ROIC). This type of noise, if not eliminated, may manifest as vertical and horizontal stripes in the final image and human observers are particularly sensitive to these types of image artifacts. Other systems relying on imagery from infrared sensors, such as, for example, automatic target trackers may also suffer from performance degradation, if row and column noise is present.

Because of non-linear behavior of infrared detectors and read-out integrated circuit (ROIC) assemblies, even when a shutter operation or external black body calibration is performed, there may be residual row and column noise (e.g., the scene being imaged may not have the exact same temperature as the shutter). The amount of row and column noise may increase over time, after offset calibration, increasing asymptotically to some maximum value. In one aspect, this may be referred to as 1/f type noise.

In any given frame, the row and column noise may be viewed as high frequency spatial noise. Conventionally, this type of noise may be reduced using filters in the spatial domain (e.g., local linear or non-linear low pass filters) or the frequency domain (e.g., low pass filters in Fourier or Wavelet space). However, these filters may have negative side effects, such as blurring of the image and potential loss of faint details.

It should be appreciated by those skilled in the art that any reference to a column or a row may include a partial column or a partial row and that the terms "row" and "column" are interchangeable and not limiting. Thus, without departing from the scope of the invention, the term "row" may be used to describe a row or a column, and likewise, the term "column" may be used to describe a row or a column, depending upon the application.

Figure 1:
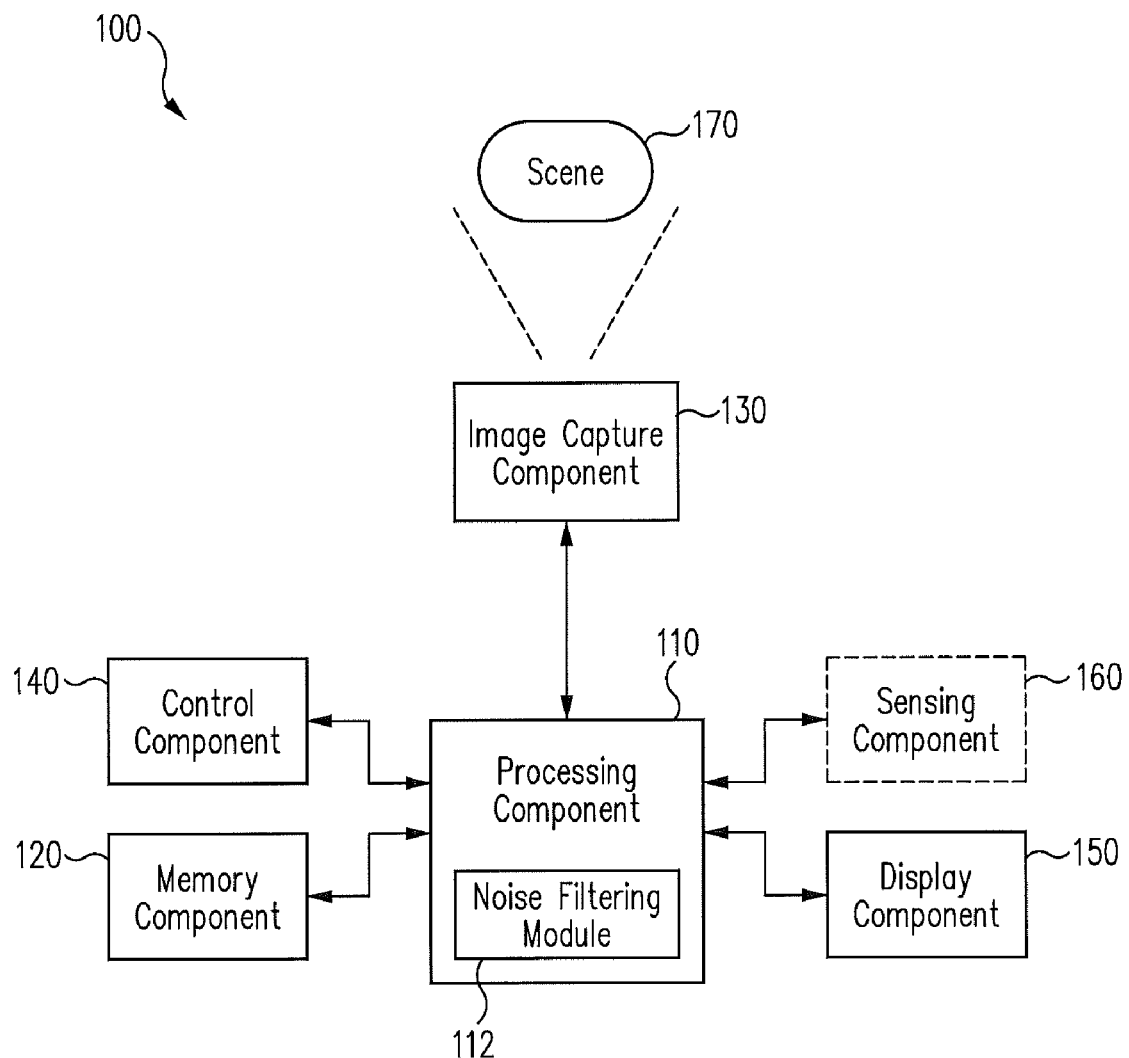
FIG. 1 shows a block diagram of a system for infrared image processing, in accordance with an embodiment of the invention.

FIG. 1 shows a block diagram of a system 100 (e.g., an infrared camera) for infrared image capturing and processing in accordance with an embodiment. The system 100 comprises, in one implementation, a processing component 110, a memory component 120, an image capture component 130, a control component 140, and a display component 150. Optionally, the system 100 may include a sensing component 160.

The system 100 may represent an infrared imaging device, such as an infrared camera, to capture and process images, such as video images of a scene 170. The system 100 may represent any type of infrared camera adapted to detect infrared radiation and provide representative data and information (e.g., infrared image data of a scene). For example, the system 100 may represent an infrared camera that is directed to the near, middle, and/or far infrared spectrums. In another example, the infrared image data may comprise non-uniform data (e.g., real image data that is not from a shutter or black body) of the scene 170, for processing, as set forth herein. The system 100 may comprise a portable device and may be incorporated, e.g., into a vehicle (e.g., an automobile or other type of land-based vehicle, an aircraft, or a spacecraft) or a non-mobile installation requiring infrared images to be stored and/or displayed.

In various embodiments, the processing component 110 comprises a processor, such as one or more of a microprocessor, a single-core processor, a multi-core processor, a microcontroller, a logic device (e.g., a programmable logic device (PLD) configured to perform processing functions), a digital signal processing (DSP) device, etc. The processing component 110 may be adapted to interface and communicate with components 120, 130, 140, and 150 to perform method and processing steps and/or operations, as described herein. The processing component 110 may include a noise filtering module 112 adapted to implement a noise reduction and/or removal algorithm (e.g., a noise filtering algorithm, such as discussed in reference to FIGS. 2A-2C). In one aspect, the processing component 110 may be adapted to perform various other image processing algorithms including scaling the infrared image data, either as part of or separate from the noise filtering algorithm.

It should be appreciated that noise filtering module 112 may be integrated in software and/or hardware as part of the processing component 110, with code (e.g., software or configuration data) for the noise filtering module 112 stored, e.g., in the memory component 120. Embodiments of the noise filtering algorithm, as disclosed herein, may be stored by a separate computer-readable medium (e.g., a memory, such as a hard drive, a compact disk, a digital video disk, or a flash memory) to be executed by a computer (e.g., a logic or processor-based system) to perform various methods and operations disclosed herein. In one aspect, the computer-readable medium may be portable and/or located separate from the system 100, with the stored noise filtering algorithm provided to the system 100 by coupling the computer-readable medium to the system 100 and/or by the system 100 downloading (e.g., via a wired link and/or a wireless link) the noise filtering algorithm from the computer-readable medium.

The memory component 120 comprises, in one embodiment, one or more memory devices adapted to store data and information, including infrared data and information. The memory device 120 may comprise one or more various types of memory devices including volatile and non-volatile memory devices, such as RAM (Random Access Memory), ROM (Read-Only Memory), EEPROM (Electrically-Erasable Read-Only Memory), flash memory, etc. The processing component 110 may be adapted to execute software stored in the memory component 120 so as to perform method and process steps and/or operations described herein.

The image capture component 130 comprises, in one embodiment, one or more infrared sensors (e.g., any type of multi-pixel infrared detector, such as a focal plane array) for capturing infrared image data (e.g., still image data and/or video data) representative of an image, such as scene 170. In one implementation, the infrared sensors of the image capture component 130 provide for representing (e.g., converting) the captured image data as digital data (e.g., via an analog-to-digital converter included as part of the infrared sensor or separate from the infrared sensor as part of the system 100). In one aspect, the infrared image data (e.g., infrared video data) may comprise non-uniform data (e.g., real image data) of an image, such as scene 170. The processing component 110 may be adapted to process the infrared image data (e.g., to provide processed image data), store the infrared image data in the memory component 120, and/or retrieve stored infrared image data from the memory component 120. For example, the processing component 110 may be adapted to process infrared image data stored in the memory component 120 to provide processed image data and information (e.g., captured and/or processed infrared image data).

The control component 140 comprises, in one embodiment, a user input and/or interface device, such as a rotatable knob (e.g., potentiometer), push buttons, slide bar, keyboard, etc., that is adapted to generate a user input control signal. The processing component 110 may be adapted to sense control input signals from a user via the control component 140 and respond to any sensed control input signals received therefrom. The processing component 110 may be adapted to interpret such a control input signal as a value, as generally understood by one skilled in the art.

In one embodiment, the control component 140 may comprise a control unit (e.g., a wired or wireless handheld control unit) having push buttons adapted to interface with a user and receive user input control values. In one implementation, the push buttons of the control unit may be used to control various functions of the system 100, such as autofocus, menu enable and selection, field of view, brightness, contrast, noise filtering, high pass filtering, low pass filtering, and/or various other features as understood by one skilled in the art. In another implementation, one or more of the push buttons may be used to provide input values (e.g., one or more noise filter values, adjustment parameters, characteristics, etc.) for a noise filter algorithm. For example, one or more push buttons may be used to adjust noise filtering characteristics of infrared images captured and/or processed by the system 100.

The display component 150 comprises, in one embodiment, an image display device (e.g., a liquid crystal display (LCD)) or various other types of generally known video displays or monitors. The processing component 110 may be adapted to display image data and information on the display component 150. The processing component 110 may be adapted to retrieve image data and information from the memory component 120 and display any retrieved image data and information on the display component 150. The display component 150 may comprise display electronics, which may be utilized by the processing component 110 to display image data and information (e.g., infrared images). The display component 150 may be adapted to receive image data and information directly from the image capture component 130 via the processing component 110, or the image data and information may be transferred from the memory component 120 via the processing component 110.

The optional sensing component 160 comprises, in one embodiment, one or more sensors of various types, depending on the application or implementation requirements, as would be understood by one skilled in the art. The sensors of the optional sensing component 160 provide data and/or information to at least the processing component 110. In one aspect, the processing component 110 may be adapted to communicate with the sensing component 160 (e.g., by receiving sensor information from the sensing component 160) and with the image capture component 130 (e.g., by receiving data and information from the image capture component 130 and providing and/or receiving command, control, and/or other information to and/or from one or more other components of the system 100).

In various implementations, the sensing component 160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. The sensing component 160 may represent conventional sensors as generally known by one skilled in the art for monitoring various conditions (e.g., environmental conditions) that may have an effect (e.g., on the image appearance) on the data provided by the image capture component 130.

In some implementations, the optional sensing component 160 (e.g., one or more of sensors) may comprise devices that relay information to the processing component 110 via wired and/or wireless communication. For example, the optional sensing component 160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of the system 100 may be combined and/or implemented or not, as desired or depending on the application or requirements, with the system 100 representing various functional blocks of a related system. In one example, the processing component 110 may be combined with the memory component 120, the image capture component 130, the display component 150, and/or the optional sensing component 160. In another example, the processing component 110 may be combined with the image capture component 130 with only certain functions of the processing component 110 performed by circuitry (e.g., a processor, a microprocessor, a logic device, a microcontroller, etc.) within the image capture component 130. Furthermore, various components of the system 100 may be remote from each other (e.g., image capture component 130 may comprise a remote sensor with processing component 110, etc. representing a computer that may or may not be in communication with the image capture component 130).

Figure 2A:
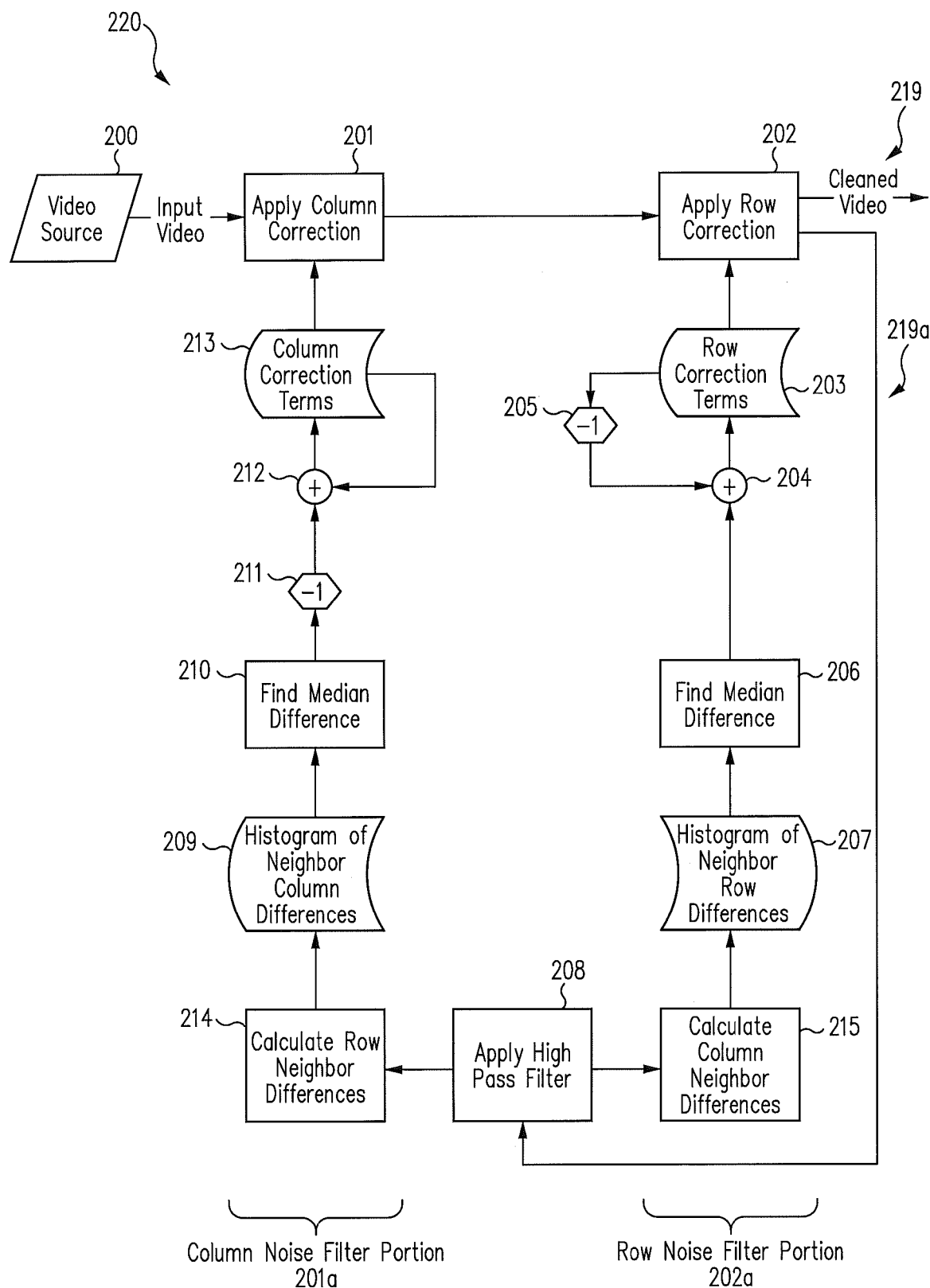
FIGS. 2A-2C are flowcharts illustrating methods for noise filtering an infrared image, in accordance with embodiments of the invention.

In accordance with an embodiment of the invention, FIG. 2A shows a method 220 for noise filtering an infrared image. In one implementation, this method 220 relates to the reduction and/or removal of temporal, 1/f, and/or fixed spatial noise in infrared imaging devices, such as infrared imaging system 100 of FIG. 1. The method 220 is adapted to utilize the row and column based noise components of infrared image data in a noise filtering algorithm. In one aspect, the row and column based noise components may dominate the noise in imagery of infrared sensors (e.g., approximately ⅔ of the total noise may be spatial in a typical micro-bolometer based system).

In one embodiment, the method 220 of FIG. 2A comprises a high level block diagram of row and column noise filtering algorithms. In one aspect, the row and column noise filter algorithms may be optimized to use minimal hardware resources.

Referring to FIG. 2A, the process flow of the method 220 implements a recursive mode of operation, wherein the previous correction terms are applied before calculating row and column noise, which may allow for correction of lower spatial frequencies. In one aspect, the recursive approach is useful when row and column noise is spatially correlated. This is sometimes referred to as banding and, in the column noise case, may manifest as several neighboring columns being affected by a similar offset error. When several neighbors used in difference calculations are subject to similar error, the mean difference used to calculate the error may be skewed, and the error may only be partially corrected. By applying partial correction prior to calculating the error in the current frame, correction of the error may be recursively reduced until the error is minimized or eliminated. In the recursive case, if the HPF is not applied (block 208), then natural gradients as part of the image may, after several iterations, be distorted when merged into the noise model. In one aspect, a natural horizontal gradient may appear as low spatially correlated column noise (e.g., severe banding). In another aspect, the HPF may prevent very low frequency scene information to interfere with the noise estimate and, therefore, limits the negative effects of recursive filtering.

Referring to method 220 of FIG. 2A, infrared image data (e.g., a raw video source, such as from the image capture component 130 of FIG. 1) is received as input video data (block 200). Next, column correction terms are applied to the input video data (block 201), and row correction terms are applied to the input video data (block 202). Next, video data (e.g., "cleaned" video data) is provided as output video data (219) after column and row corrections are applied to the input video data. In one aspect, the term "cleaned" may refer to removing or reducing noise (blocks 201, 202) from the input video data via, e.g., one or more embodiments of the noise filter algorithm.

Referring to the processing portion (e.g., recursive processing) of FIG. 2A, a HPF is applied (block 208) to the output video data 219 via data signal path 219a. In one implementation, the high pass filtered data is separately provided to a column noise filter portion 201a and a row noise filter portion 202a.

Referring to the column noise filter portion 201a, the method 220 may be adapted to process the input video data 200 and/or output video data 219 as follows:

1. Apply previous column noise correction terms to a current frame as calculated in a previous frame (block 201).
2. High pass filter the row of the current frame by subtracting the result of a low pass filter (LPF) operation (block 208), for example, as discussed in reference to FIGS. 3A-3C.
3. For each pixel, calculate a difference between a center pixel and one or more (e.g., eight) nearest neighbors (block 214). In one implementation, the nearest neighbors comprise one or more nearest horizontal neighbors. The nearest neighbors may include one or more vertical or other non-horizontal neighbors (e.g., not pure horizontal, i.e., on the same row), without departing from the scope of the invention.
4. If the calculated difference is below a predefined threshold, add the calculated difference to a histogram of differences for the specific column (block 209).
5. At an end of the current frame, find a median difference by examining a cumulative histogram of differences (block 210). In one aspect, for added robustness, only differences with some specified minimum number of occurrences may be used.
6. Delay the current correction terms for one frame (block 211), i.e., they are applied to the next frame.
7. Add median difference (block 212) to previous column correction terms to provide updated column correction terms (block 213).
8. Apply updated column noise correction terms in the next frame (block 201).

Referring to the row noise filter portion 202a, the method 220 may be adapted to process the input video data 200 and/or output video data 219 as follows:

1. Apply previous row noise correction terms to a current frame as calculated in a previous frame (block 202).
2. High pass filter the column of the current frame by subtracting the result of a low pass filter (LPF) operation (block 208), as discussed similarly above for column noise filter portion 201a.
3. For each pixel, calculate a difference between a center pixel and one or more (e.g., eight) nearest neighbors (block 215). In one implementation, the nearest neighbors comprise one or more nearest vertical neighbors. The nearest neighbors may include one or more horizontal or other non-vertical neighbors (e.g., not pure vertical, i.e., on the same column), without departing from the scope of the invention.
4. If the calculated difference is below a predefined threshold, add the calculated difference to a histogram of differences for the specific row (block 207).
5. At an end of the current row (e.g., line), find a median difference by examining a cumulative histogram of differences (block 206). In one aspect, for added robustness only differences with some specified minimum number of occurrences may be used.
6. Delay the current frame by a time period equivalent to the number of nearest vertical neighbors used, for example eight.
7. Add median difference (block 204) to row correction terms (block 203) from previous frame (block 205).
8. Apply updated row noise correction terms in the current frame (block 202). In one aspect, this may require a row buffer (e.g., as mentioned in 6).

In one aspect, for all pixels (or at least a large subset of them) in each column, an identical offset term (or set of terms) may be applied for each associated column. This may prevent the filter from blurring spatially local details.

Similarly, in one aspect, for all pixels (or at least a large subset of them) in each row respectively, an identical offset term (or set of terms) may be applied. This may inhibit the filter from blurring spatially local details.

In one example, an estimate of the column offset terms may be calculated using only a subset of the rows (e.g., the first 32 rows). In this case, only a 32 row delay is needed to apply the column correction terms in the current frame. This may improve filter performance in removing high temporal frequency column noise. Alternatively, the filter may be designed with minimum delay, and the correction terms are only applied once a reasonable estimate can be calculated (e.g., using data from the 32 rows). In this case, only rows 33 and beyond may be optimally filtered.

In one aspect, all samples may not be needed, and in such an instance, only every $2^{nd}$ or $4^{th}$ row, e.g., may be used for calculating the column noise. In another aspect, the same may apply when calculating row noise, and in such an instance, only data from every $4^{th}$ column, e.g., may be used. It should be appreciated that various other iterations may be used by one skilled in the art without departing from the scope of the invention.

In one aspect, the filter may operate in recursive mode in which the filtered data is filtered instead of the raw data being filtered. In another aspect, the mean difference between a pixel in one row and pixels in neighboring rows may be approximated in an efficient way if a recursive (IIR) filter is used to calculate an estimated running mean. For example, instead of taking the mean of neighbor differences (e.g., eight neighbor differences), the difference between a pixel and the mean of the neighbors may be calculated.

Figure 2B:
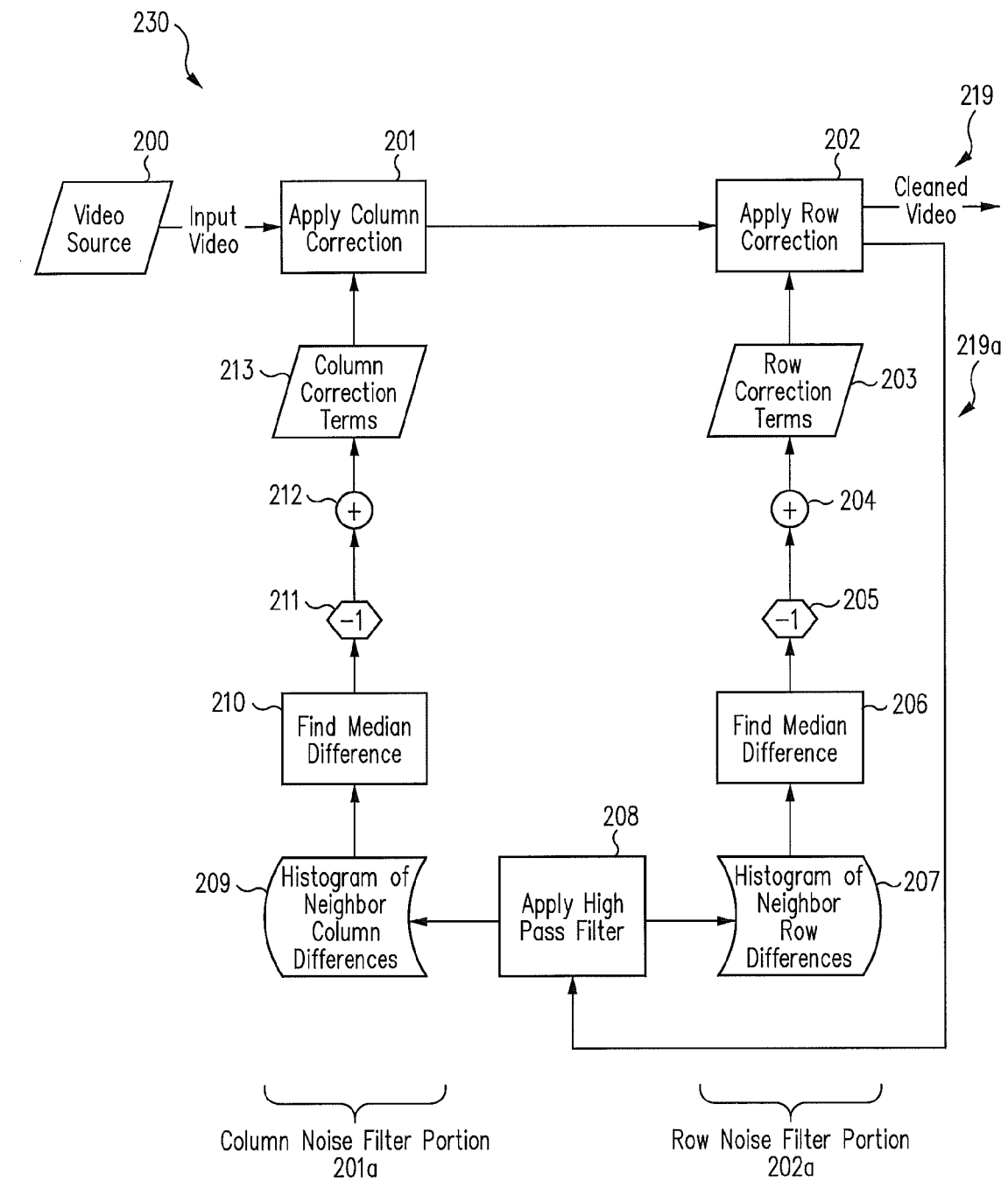

In accordance with an embodiment of the invention, FIG. 2B shows an alternative method 230 for noise filtering infrared image data. In reference to FIGS. 2A and 2B, one or more of the process steps and/or operations of method 220 of FIG. 2A have changed order or have been altered or combined for the method 230 of FIG. 2B. For example, the operation of calculating row and column neighbor differences (blocks 214, 215) may be removed or combined with other operations, such as generating histograms of row and column neighbor differences (blocks 207, 209). In another example, the delay operation (block 205) may be performed after finding the median difference (block 206). In various examples, it should be appreciated that similar process steps and/or operations have similar scope, as previously described in FIG. 2A, and therefore, the description will not be repeated.

In still other alternate approaches to methods 220 and 230, embodiments may exclude the histograms and rely on mean calculated differences instead of median calculated differences. In one aspect, this may be slightly less robust but may allow for a simpler implementation of the column and row noise filters. For example, the mean of neighboring rows and columns, respectively, may be approximated by a running mean implemented as an infinite impulse response (IIR) filter. In the row noise case, the IR filter implementation may reduce or even eliminate the need to buffer several rows of data for mean calculations.

In still other alternate approaches to methods 220 and 230, new noise estimates may be calculated in each frame of the video data and only applied in the next frame (e.g., after noise estimates). In one aspect, this alternate approach may provide less performance but may be easier to implement. In another aspect, this alternate approach may be referred to as a non-recursive method, as understood by those skilled in the art.

Figure 2C:
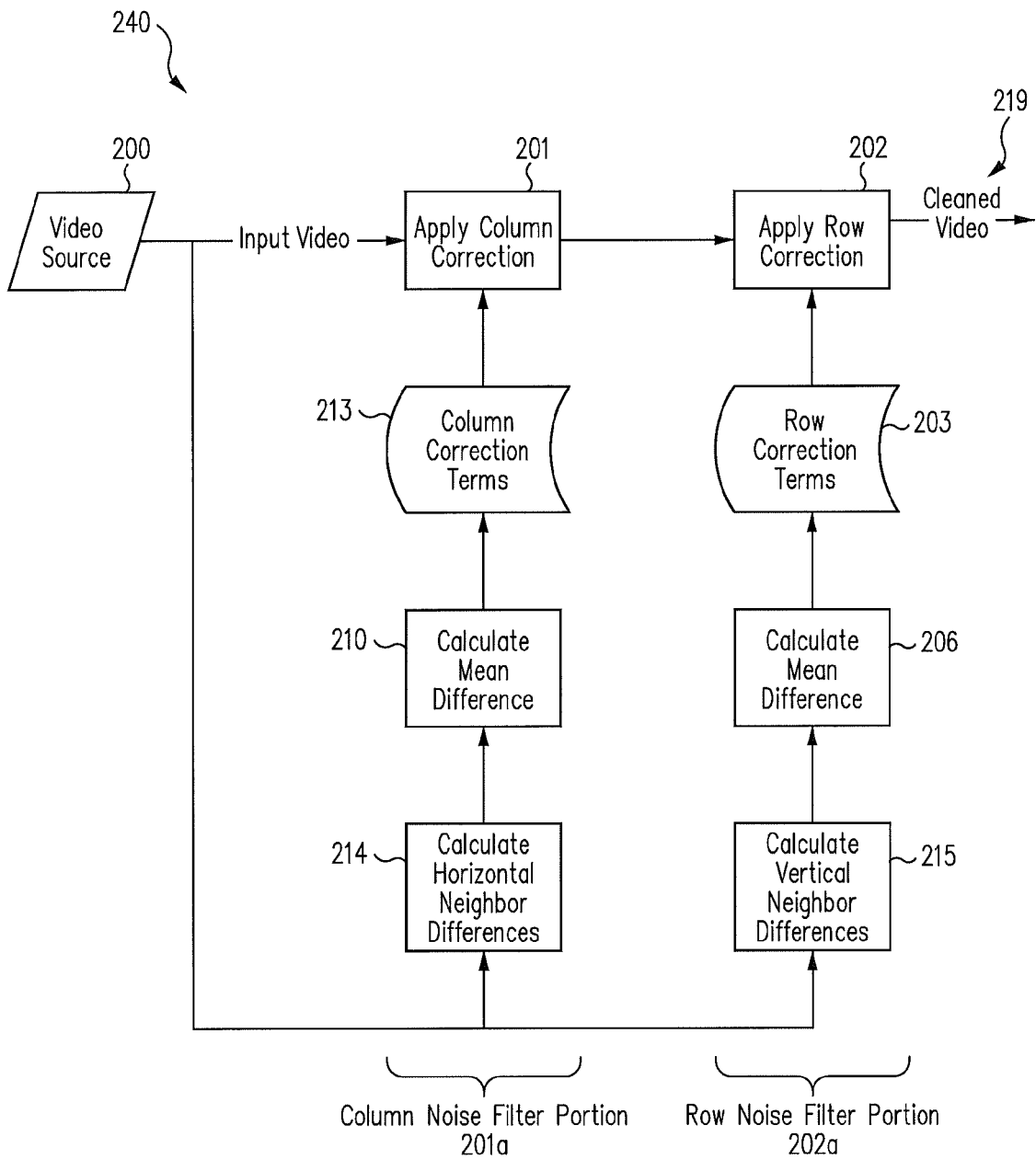

For example, in one embodiment, the method 240 of FIG. 2C comprises a high level block diagram of row and column noise filtering algorithms. In one aspect, the row and column noise filter algorithms may be optimized to use minimal hardware resources. In reference to FIGS. 2A and 2B, similar process steps and/or operations may have similar scope, and therefore, the descriptions will not be repeated.

Referring to FIG. 2C, the process flow of the method 240 implements a non-recursive mode of operation. As shown, the method 240 applies column offset correction term 201 and row offset correction term 202 to the uncorrected input video data from video source 200 to produce, e.g., a corrected or cleaned output video signal 219. In column noise filter portion 201a, column offset correction terms 213 are calculated based on the mean difference 210 between pixel values in a specific column and one or more pixels belonging to neighboring columns 214. In row noise filter portion 202a, row offset correction terms 203 are calculated based on the mean difference 206 between pixel values in a specific row and one or more pixels belonging to neighboring rows 215. In one aspect, the order (e.g., rows first or columns first) in which row or column offset correction terms 203, 213 are applied to the input video data from video source 200 may be considered arbitrary. In another aspect, the row and column correction terms may not be fully known until the end of the video frame, and therefore, if the input video data from the video source 200 is not delayed, the row and column correction terms 203, 213 may not be applied to the input video data from which they where calculated.

In one aspect of the invention, the column and row noise filter algorithm may operate continuously on image data provided by an infrared imaging sensor (e.g., image capture component 130 of FIG. 1). Unlike conventional methods that may require a uniform scene (e.g., as provided by a shutter or external calibrated black body) to estimate the spatial noise, the column and row noise filter algorithms, as set forth in one or more embodiments, may operate on real-time scene data. In one aspect, an assumption may be made that, for some small neighborhood around location [x, y], neighboring infrared sensor elements should provide similar values since they are imaging parts of the scene in close proximity. If the infrared sensor reading from a particular infrared sensor element differs from a neighbor, then this could be the result of spatial noise. However, in some instances, this may not be true for each and every sensor element in a particular row or column (e.g., due to local gradients that are a natural part of the scene), but on average, a row or column may have values that are close to the values of the neighboring rows and columns.

For one or more embodiments, by first taking out one or more low spatial frequencies (e.g., using a high pass filter (HPF)), the scene contribution may be minimized to leave differences that correlate highly with actual row and column spatial noise. In one aspect, by using an edge preserving filter, such as a Median filter or a Bilateral filter, one or more embodiments may minimize artifacts due to strong edges in the image.

Figure 3A:
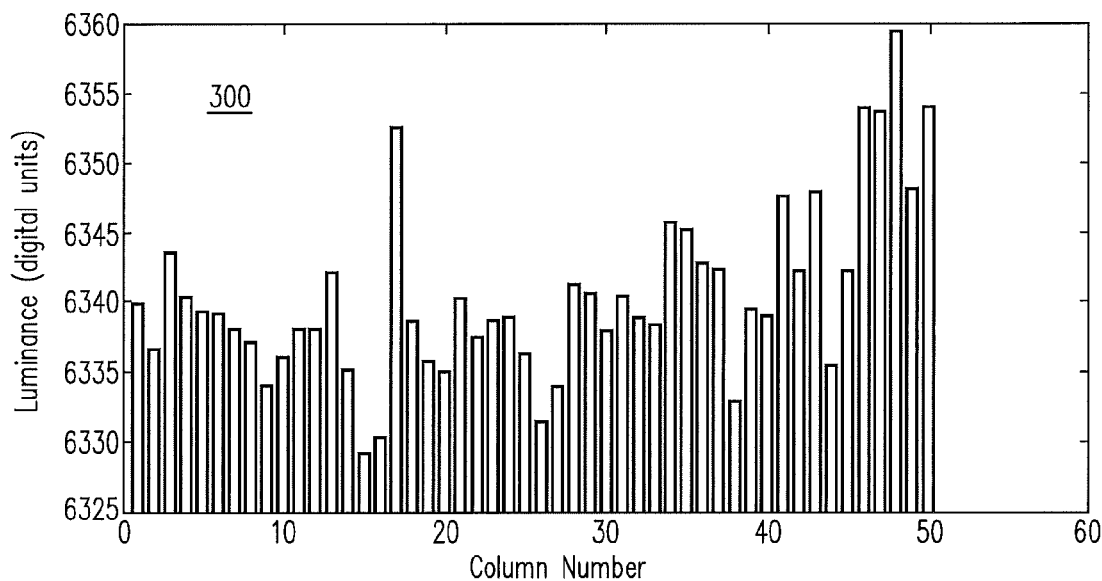
FIGS. 3A-3C are graphs illustrating infrared image data and the processing of an infrared image, in accordance with embodiments of the invention.
Figure 3B:
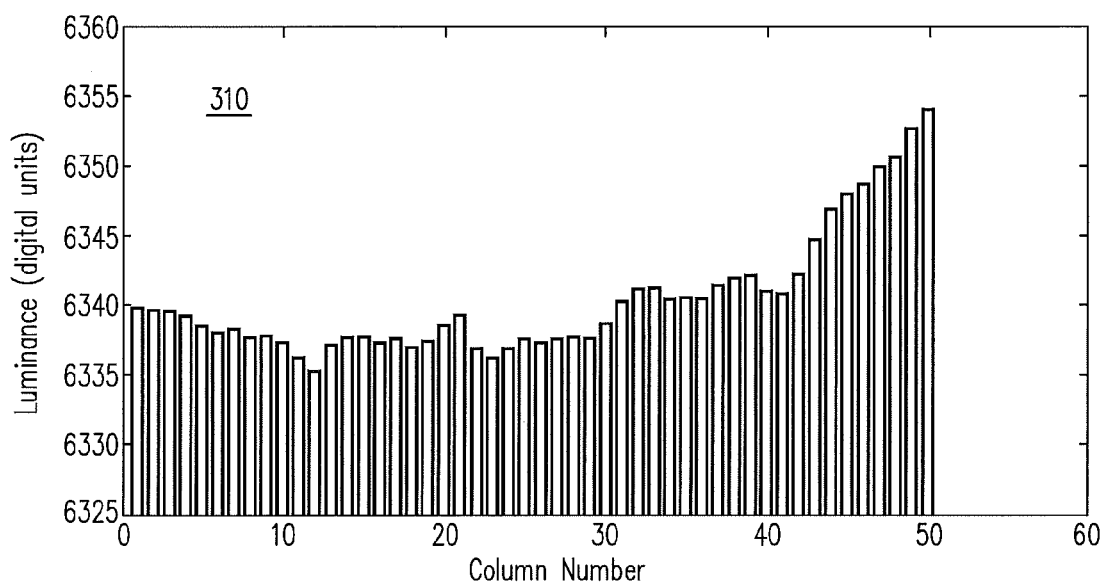
Figure 3C:
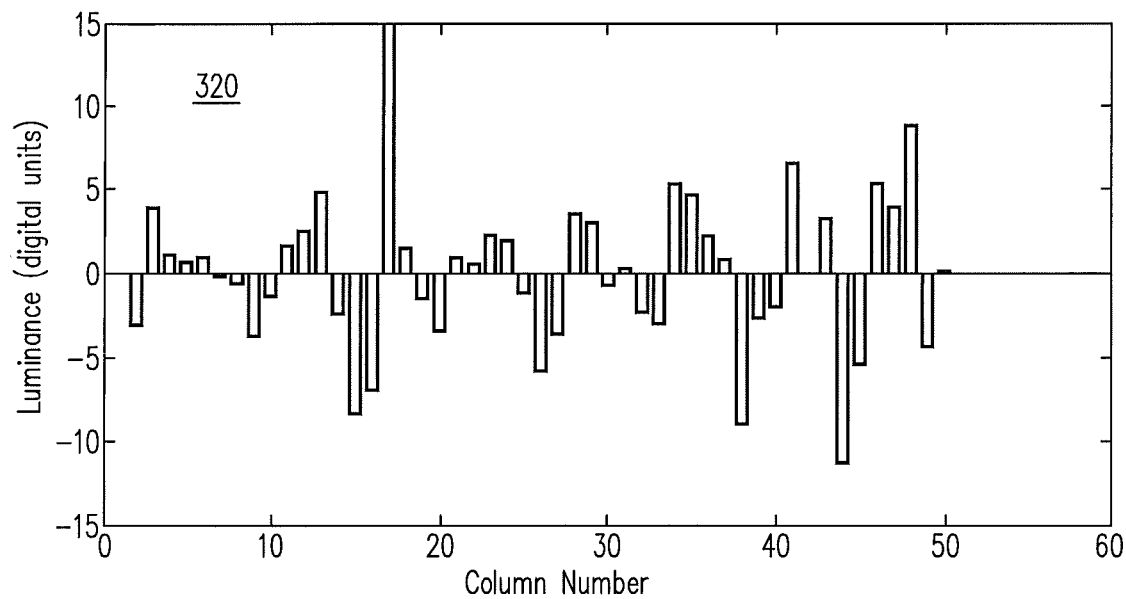

In accordance with one or more embodiments of the invention, FIGS. 3A to 3C show a graphical implementation (e.g., digital counts versus data columns) of filtering an infrared image. FIG. 3A shows a graphical illustration (e.g., graph 300) of typical values, as an example, from a row of sensor elements when imaging a scene. FIG. 3B shows a graphical illustration (e.g., graph 310) of a result of a low pass filtering (LPF) of the image data values from FIG. 3A. FIG. 3C shows a graphical illustration (e.g., graph 320) of subtracting the low pass filter (LPF) output in FIG. 3B from the original image data in FIG. 3A, which results in a high pass filter (HPF) profile with low and mid frequency components removed from the scene of the original image data in FIG. 3A. Thus, FIG. 3A-3C illustrate a HPF technique, which may be used for one or more embodiments (e.g., as with methods 220 and/or 230).

In one aspect of the invention, a final estimate of column and/or row noise may be referred to as an average or median estimate of all of the measured differences. Because noise characteristics of an infrared sensor are often generally known, then one or more thresholds may be applied to the noise estimates. For example, if a difference of 60 digital counts is measured, but it is known that the noise typically is less than 10 digital counts, then this measurement may be ignored.

Figure 4:
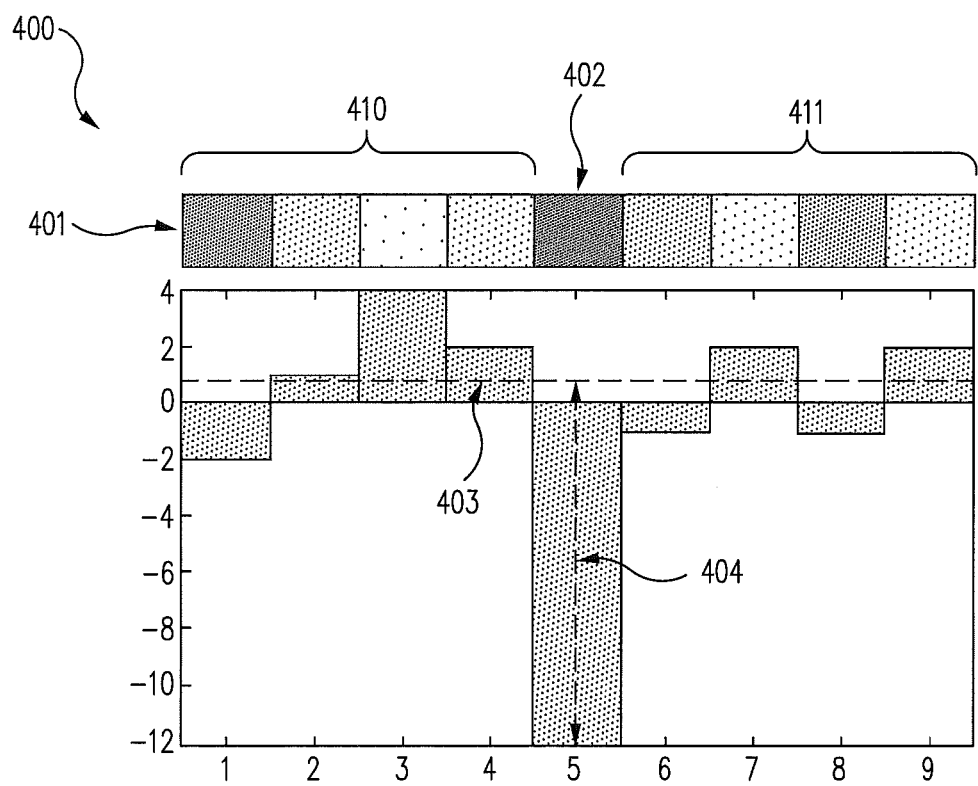
FIG. 4 shows a portion of a row of sensor data for discussing processing techniques, in accordance with embodiments of the invention.

In accordance with one or more embodiments of the invention, FIG. 4 shows a graphical illustration 400 (e.g., digital counts versus data columns) of a row of sensor data 401 (e.g., a row of pixel data for a plurality of pixels in a row) with column 5 data 402 and data for eight nearest neighbors (e.g., nearest pixel neighbors, 4 columns 410 to the left of column 5 data 402 and 4 columns 411 to the right of column 5 data 402). In one aspect, referring to FIG. 4, the row of sensor data 401 is part of a row of sensor data for an image or scene captured by a multi-pixel infrared sensor or detector (e.g., image capture component 130 of FIG. 1). In one aspect, column 5 data 402 is a column of data to be corrected. For this row of sensor data 401, the difference between column 5 data 402 and a mean 403 of its neighbor columns (410, 411) is indicated by an arrow 404. Therefore, noise estimates may be obtained and accounted for based on neighboring data.

Figure 5A:
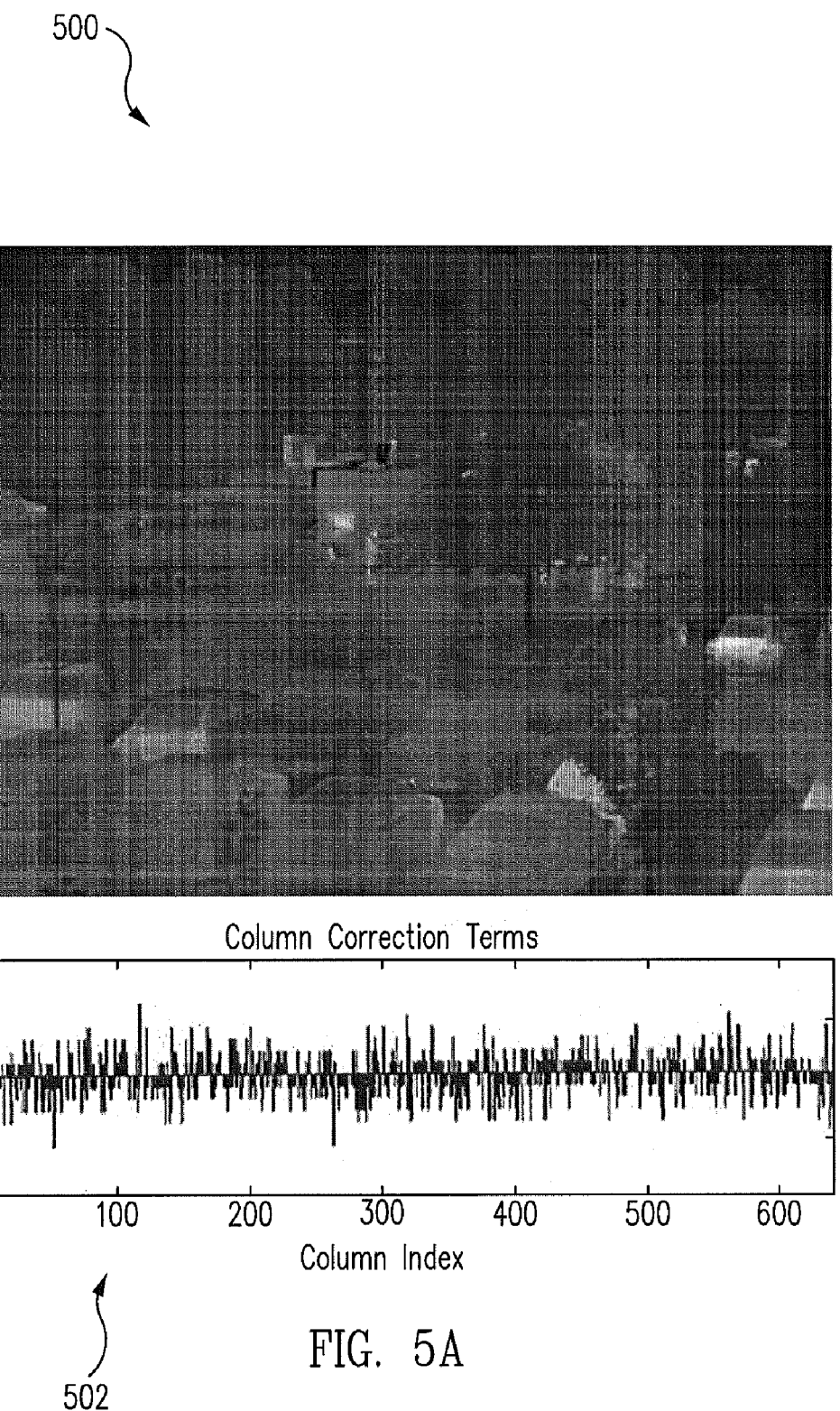
FIGS. 5A to 5C show an exemplary implementation of column and row noise filtering for an infrared image, in accordance with embodiments of the invention.
Figure 5B:
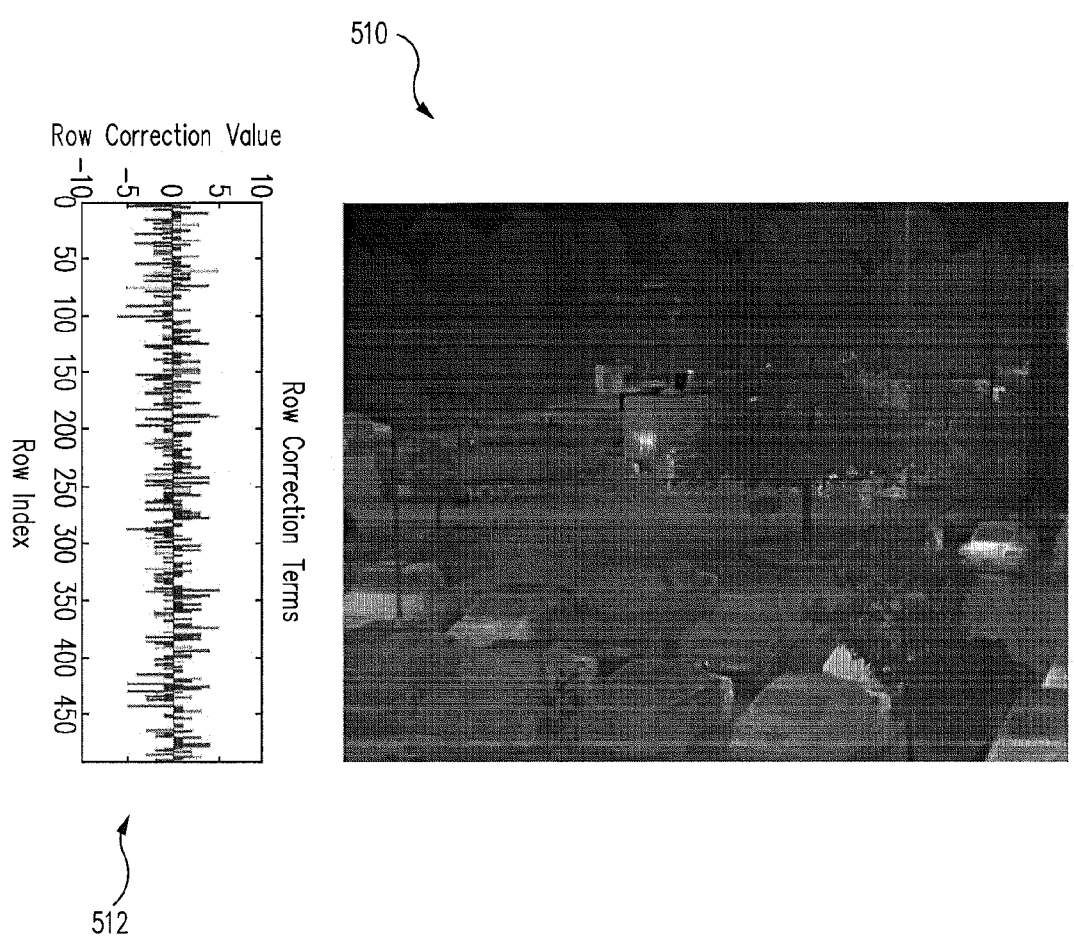
Figure 5C:
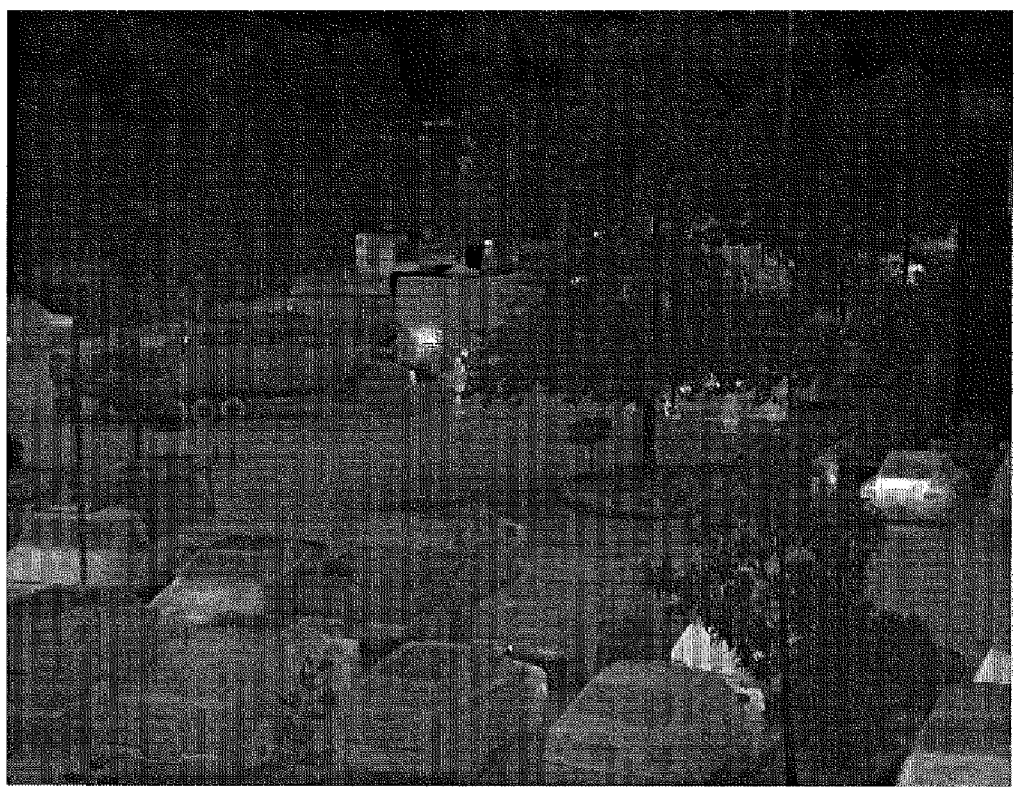

In accordance with one or more embodiments of the invention, FIGS. 5A to 5C show an exemplary implementation of column and row noise filtering an infrared image (e.g., an image frame from infrared video data). FIG. 5A shows an infrared image 500 with column noise estimated from a scene with severe row and column noise present and a corresponding graph 502 of column correction terms. FIG. 5B shows an infrared image 510, with column noise removed and spatial row noise still present, with row correction terms estimated from the scene in FIG. 5A and a corresponding graph 512 of row correction terms. FIG. 5C shows an infrared image 520 of the scene in FIG. 5A as a cleaned infrared image with row and column noise removed (e.g., column and row correction terms of FIGS. 5A-5B applied).

In one embodiment, FIG. 5A shows an infrared video frame (i.e., infrared image 500) with severe row and column noise. Column noise correction coefficients are calculated as described herein to produce, e.g., 639 correction terms, i.e., one correction term per column. The graph 502 shows the column correction terms. These offset correction terms are subtracted from the infrared video frame 500 of FIG. 5A to produce the infrared image 510 in FIG. 5B. As shown in FIG. 5B, the row noise is still present. Row noise correction coefficients are calculated as described herein to produce, e.g., 639 row terms, i.e., one correction term per row. The graph 512 shows the row offset correction terms, which are subtracted from the infrared image 510 in FIG. 5B to produce the cleaned infrared image 520 in FIG. 5C with significantly reduced or removed row and column noise.

In various embodiments, it should be understood that both row and column filtering is not required. For example, either column noise filtering 201a or row noise filtering 202a may be performed in methods 220, 230 or 240.

It should be appreciated that any reference to a column or a row may include a partial column or a partial row and that the terms "row" and "column" are interchangeable and not limiting. For example, without departing from the scope of the invention, the term "row" may be used to describe a row or a column, and likewise, the term "column" may be used to describe a row or a column, depending upon the application.

In various aspects, column and row noise may be estimated by looking at a real scene (e.g., not a shutter or a black body), in accordance with embodiments of the noise filtering algorithms, as disclosed herein. The column and row noise may be estimated by measuring the median or mean difference between sensor readings from elements in a specific row (and/or column) and sensor readings from adjacent rows (and/or columns).

Optionally, a high pass filter may be applied to the image data prior to measuring the differences, which may reduce or at least minimize a risk of distorting gradients that are part of the scene and/or introducing artifacts. In one aspect, only sensor readings that differ by less than a configurable threshold may be used in the mean or median estimation. Optionally, a histogram may be used to effectively estimate the median. Optionally, only histogram bins exceeding a minimum count may be used when finding the median estimate from the histogram. Optionally, a recursive IIR filter may be used to estimate the difference between a pixel and its neighbors, which may reduce or at least minimize the need to store image data for processing, e.g., the row noise portion (e.g., if image data is read out row wise from the sensor). In one implementation, the current mean column value $\overline{C}_{i,j}$ for column i at row j may be estimated using the following recursive filter algorithm.

$$\overline{C}_{i,j} = (1-\alpha) \cdot \overline{C}_{i-1,j} + \alpha \cdot C_{i,j}$$

$$\Delta R_i = \frac{1}{N} \sum_{j=1}^{N} C_{i,j} - \overline{C}_{i-1,j}$$

In this equation $\alpha$ is the damping factor and may be set to for example 0.2 in which case the estimate for the running mean of a specific column i at row j will be a weighted sum of the estimated running mean for column i−1 at row j and the current pixel value at row j and column i. The estimated difference between values of row j and the values of neighboring rows can now be approximated by taking the difference of each value $C_{i,j}$ and the running recursive mean of the neighbors above row i ($\overline{C}_{i-1,j}$). Estimating the mean difference this way is not as accurate as taking the true mean difference since only rows above are used but it requires that only one row of running means are stored as compared to several rows of actual pixel values be stored.

In one embodiment, referring to FIG. 2A, the process flow of method 220 may implement a recursive mode of operation, wherein the previous column and row correction terms are applied before calculating row and column noise, which allows for correction of lower spatial frequencies when the image is high pass filtered prior to estimating the noise.

Generally, during processing, a recursive filter re-uses at least a portion of the output data as input data. The feedback input of the recursive filter may be referred to as an infinite impulse response (IIR), which may be characterized, e.g., by exponentially growing output data, exponentially decaying output data, or sinusoidal output data. In some implementations, a recursive filter may not have an infinite impulse response. As such, e.g., some implementations of a moving average filter function as recursive filters but with a finite impulse response (FIR).

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into subcomponents having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

Embodiments described herein illustrate but do not limit the invention. It should also be understood that numerous modifications and variations are possible in accordance with the principles of the invention. Accordingly, the scope of the invention is defined only by the following claims.

What is claimed is:

1. A method for processing infrared image data, comprising:
   receiving infrared image data from a multi-pixel infrared detector based on a non-uniform scene;
   determining column noise offset terms for corresponding columns, wherein the determining comprises:
      calculating, for each pixel, a difference between a center pixel and a plurality of neighboring pixels to determine column neighbor differences, and
      generating, for each column, a histogram of the column neighbor differences;
   applying column noise filter correction to the infrared image data based on the column noise offset terms, wherein the column noise offset term is applied to at least a majority of the infrared image data in each corresponding column;
   providing corrected infrared image data based on the column noise filter correction as infrared output image data; and
   storing the infrared output image data.

2. The method of claim 1, further comprising:
   determining row noise offset terms for corresponding rows; and
   applying row noise filter correction to the infrared image data based on the row noise offset terms, wherein the row noise offset term is applied to at least a majority of the infrared image data in each corresponding row,
   wherein the providing corrected infrared image data as infrared output image data is further based on the row noise filter correction.

3. The method of claim 2, wherein:
   the determining the row noise offset terms comprises calculating, for each pixel, a difference between a center pixel and a plurality of neighboring pixels to determine row neighbor differences.

4. The method of claim 3, wherein the determining the row noise offset terms comprises generating, for each row, a histogram of the row neighbor differences.

5. The method of claim 4, comprising:
   separately comparing the column and row neighbor differences to a predetermined threshold; and
   adding the column and row neighbor differences to respective columns and rows, if the difference is below the predetermined threshold.

6. The method of claim 5, wherein the adding of the column and row neighbor differences to respective columns and rows comprises adding the column and row neighbor differences to the histogram for specific columns and rows, respectively.

7. The method of claim 6, comprising determining a median difference for respective columns and rows.

8. The method of claim 7, comprising:
   adding the median difference to one or more previous column and row correction terms for respective columns and rows; and
   applying the column and row correction terms to the infrared image data.

9. The method of claim 2, comprising high pass filtering the infrared image data prior to applying the column and row noise filter correction to the infrared image data.

10. The method of claim 9, wherein the high pass filtering of respective rows and columns comprises subtracting a result of a low pass filter operation.

11. The method of claim 2, comprising:
    delaying the infrared image data by one frame prior to applying the column and row noise filter correction; and
    displaying the infrared output image data.

12. An infrared imaging system, comprising:
    an infrared detector;
    a processor adapted to process infrared image data from the infrared detector of a non-uniform scene by:
       receiving infrared image data based on a non-uniform scene from a multi-pixel infrared detector;
       determining column noise offset terms for corresponding columns, wherein the determining comprises:
          calculating, for each pixel, a difference between a center pixel and a plurality of neighboring pixels to determine column neighbor differences, and
          generating, for each column, a histogram of the column neighbor differences;
       applying column noise filter correction to the infrared image data based on the column noise offset terms, wherein the column noise offset term is applied to at least a majority of the infrared image data in each corresponding column; and
       providing corrected infrared image data based on the column noise filter correction as infrared output image data; and
    a memory component adapted to store the infrared output image data.

13. The infrared imaging system of claim 12, wherein the processor is further adapted to process infrared image data from the infrared detector of a non-uniform scene by:
    determining row noise offset terms for corresponding rows; and
    applying row noise filter correction to the infrared image data based on the row noise offset terms, wherein the row noise offset term is applied to at least a majority of the infrared image data in each corresponding row,
    wherein the providing corrected infrared image data as infrared output image data is further based on the row noise filter correction.

14. The infrared imaging system of claim 13, wherein:
    the determining the row noise offset terms comprises calculating, for each pixel, a difference between a center pixel and a plurality of neighboring pixels to determine row neighbor differences.

15. The infrared imaging system of claim 14, wherein the determining row noise offset terms comprises generating, for each row, a histogram of the row neighbor differences.

16. The infrared imaging system of claim 15, wherein the determining row and column noise offset terms comprises processing infrared image data by:
    separately comparing the column and row neighbor differences to a predetermined threshold; and adding the column and row neighbor differences to respective columns and rows, if the difference is below the predetermined threshold.

17. The infrared imaging system of claim 16, wherein the adding of the column and row neighbor differences to respective columns and rows comprises adding the column and row neighbor differences to the histogram for specific columns and rows, respectively.

18. The infrared imaging system of claim 17, wherein the determining row and column noise offset terms comprises processing infrared image data by determining a median difference for respective columns and rows.

19. The infrared imaging system of claim 18, wherein the determining row and column noise offset terms comprises processing infrared image data by:
    adding the median difference to one or more previous column and row correction terms for respective columns and rows; and
    applying the column and row correction terms to the infrared image data.

20. The infrared imaging system of claim 19, wherein the determining row and column noise offset terms comprises processing infrared image data by high pass filtering the infrared image data prior to applying column and row noise filter correction to the infrared image data.

21. The infrared imaging system of claim 13, wherein the processor is adapted to process infrared image data by:
    delaying the infrared image data by one frame prior to applying the column and row noise filter correction; and
    displaying the infrared output image data via a display component.

22. The infrared imaging system of claim 12, wherein the infrared imaging system comprises an infrared camera adapted to capture and process the infrared image data including infrared video image data of the non-uniform scene, and wherein the infrared detector is adapted to detect infrared radiation and provide representative infrared image data of the non-uniform scene.

23. The infrared imaging system of claim 12, wherein the infrared detector is remote from the processor, and wherein the infrared detector is adapted to remotely relay infrared image data to the processor, with the processor comprising a computer system.

24. The infrared imaging system of claim 12, wherein the infrared imaging system comprises an infrared camera, the infrared camera comprising:
    a control component adapted to interface with a user and receive user input control signals to control various operations of the infrared imaging system; and
    a display component adapted to display infrared image data,
    wherein the processor is adapted to obtain infrared image data from the infrared detector and display the obtained infrared image data on the display component, and
    wherein the processor is adapted to retrieve infrared image data from the memory component and display the retrieved infrared image data on the display component.

25. A non-transitory computer readable medium on which are stored computer readable instructions for performing the method of claim 1.

26. A non-transitory computer readable medium on which are stored computer readable instructions for performing the method of claim 2.

* * * * *

UNITED STATES PATENT AND TRADEMARK OFFICE
CERTIFICATE OF CORRECTION

| | | |
|---|---|---|
| PATENT NO. | : 8,208,026 B2 | Page 1 of 1 |
| APPLICATION NO. | : 12/396340 | |
| DATED | : June 26, 2012 | |
| INVENTOR(S) | : Nicholas Högasten and Malin Ingerhed | |

It is certified that error appears in the above-identified patent and that said Letters Patent is hereby corrected as shown below:

In column 9, line 46, please delete the acronym "IR" and replace it with the acronym "IIR."

Signed and Sealed this
Sixteenth Day of October, 2012

David J. Kappos
*Director of the United States Patent and Trademark Office*